United States Patent [19]
Töpfer et al.

[11] Patent Number: 5,409,301
[45] Date of Patent: Apr. 25, 1995

[54] METHOD OF DETERMINING AN OPTIMIZED VALUE OF BRAKE PRESSURE RATIO BETWEEN A TRACTOR AND A TRAILER OR SEMITRAILER

[75] Inventors: Bernhard Töpfer, Stuttgart; Bodo Klein, Esslingen; Wolfgang Müller, Ebersbach, all of Germany

[73] Assignee: Mercedes-Benz AG, Germany

[21] Appl. No.: 971,234

[22] Filed: Nov. 4, 1992

[30] Foreign Application Priority Data

Nov. 7, 1991 [DE] Germany .................. 41 36 571.2

[51] Int. Cl.⁶ .......................... B60T 8/00; B60T 8/18
[52] U.S. Cl. ............................... 303/7; 303/22.1
[58] Field of Search ............... 303/7, 9.61, 9.62, 9.69, 303/13, 15, 20, DIG. 1, DIG. 2, 22.1

[56] References Cited

U.S. PATENT DOCUMENTS

| | | | |
|---|---|---|---|
| 3,545,815 | 12/1970 | Berg | 303/7 |
| 3,574,414 | 4/1971 | Jocob | 303/7 |
| 3,582,149 | 6/1971 | Berg | 303/7 |
| 5,050,938 | 9/1991 | Brearley et al. | 303/20 X |

FOREIGN PATENT DOCUMENTS

| | | |
|---|---|---|
| 0485738 | 10/1991 | European Pat. Off. |
| 0370678 | 5/1992 | European Pat. Off. |
| 4035805 | 3/1992 | Germany . |
| 283922 | 12/1928 | United Kingdom . |

*Primary Examiner*—Robert J. Oberleitner
*Assistant Examiner*—Peter M. Poon
*Attorney, Agent, or Firm*—Evenson, McKeown, Edwards & Lenahan

[57] ABSTRACT

A method is provided to determine an optimized value of the brake pressure ratio between a tractor and a trailer or semitrailer. In particular, an increased value of the brake pressure of the trailer or semitrailer in relation to the brake pressure resulting from the position of the brake pedal is supplied for a particular duration at the beginning of a braking operation. The increase of the brake pressure of the trailer or semitrailer takes place as a function of the brake pressure, $p_{Anh}$, resulting from the position of the brake pedal. In braking operations when a tractor is travelling without a trailer or semitrailer, an allocation of the achieved deceleration, $z_{ist}$, to the brake pressure $p_{Zug}$ of the tractor is stored as a function of the load state of the tractor. When the tractor is travelling with a trailer or semitrailer, a brake pressure is supplied for the trailer or semitrailer and is allocated to the brake pressure of the tractor such that, in subsequent braking operations, the actual value of the deceleration which is then set at a prevailing brake pressure of the tractor, giving due regard to the load state of the tractor, corresponds to the value, derived from the stored allocation, of the deceleration achieved without a trailer or semitrailer at the same brake pressure of the tractor.

11 Claims, 3 Drawing Sheets

METHOD OF DETERMINING AN OPTIMIZED VALUE OF BRAKE PRESSURE RATIO BETWEEN A TRACTOR AND A TRAILER OR SEMITRAILER

CROSS-REFERENCE TO RELATED APPLICATION

This application is related to application Ser. No 07/944,324 entitled TRACTOR/TRAILER BRAKE PRESSURE REGULATION METHOD AND SYSTEM filed in the name of Bernhard Töpfer on Sep. 14, 1992.

BACKGROUND AND SUMMARY OF THE INVENTION

The present invention relates to a method of determining an optimized value of brake pressure ratio between a tractor and one of a trailer and semitrailer, and, more particularly, to a method in which an increased value of the brake pressure of the trailer or semitrailer in relation to the brake pressure resulting from the position of the brake pedal is targeted for a particular duration at the beginning of a braking operation and to a method in which a brake pressure being targeted for the trailer is allocated to the brake pressure of the tractor.

A method of determining a value of the brake pressure ratio between a tractor and a trailer or semitrailer has already been disclosed in the above-mentioned application. In that disclosed method, the allocations of the brake pressures of the tractor and of the trailer or semitrailer are recorded during steady-state braking operations and stored as reference values for future braking operations. Intermediate values between these stored allocations are gained by interpolation from the stored allocations. After the reference values of the brake pressures have been set, an adjustment takes place such that the measured coupling force between the tractor and the trailer or semitrailer is adjusted to its set value. If, in turn, a steady-state braking operation is achieved by this adjustment, the allocation of the brake pressures of the tractor and the trailer or semitrailer which have then been set is, in turn, recorded and stored. Furthermore, it is disclosed in this application to carry out a pressure boost at the beginning of a braking operation by giving the trailer or semitrailer a constant value of the brake pressure which is increased in relation to steady-state values for a particular duration at the beginning of a braking operation.

An object of the invention is to determine a brake pressure ratio between a tractor and a trailer or semitrailer so as to give the greatest possible driving comfort, the least possible wear of the components and the greatest possible degree of driving safety with the least possible constructional expenditure at the same time.

This object has been achieved in a method of determining an optimized value of the brake pressure ratio between a tractor and a trailer or semitrailer according to the present invention by the increase of the brake pressure of the trailer or semitrailer taking place as a function of the brake pressure resulting from the position of the brake pedal. In braking operations when the tractor is travelling without one of the trailer and semitrailer, an allocation of achieved deceleration to the tractor brake pressure is stored as a function of a load state of the tractor, the allocation comprising the forming of a ratio of achieved deceleration to the tractor brake pressure whereby, in subsequent braking operations when the tractor is travelling with one of the trailer and semitrailer, the brake pressure is supplied for one of the trailer and semitrailer and is allocated to the tractor brake pressure such that, in the braking operations, the actual value of the deceleration at the prevailing tractor brake pressure, with regard to the current tractor load state, corresponds to the value, derived from the stored allocation, of the deceleration achieved without one of the trailer and semitrailer at the same tractor brake pressure and with the same tractor load state.

It is advantageous in the present invention that the sensing of the coupling force can be dispensed with. To simplify a description of the present invention, only the term "trailer" is used in the following text. It will be understood by one of ordinary skill that the ratios for a semitrailer result analogously.

To compensate for or at least reduce the "run-up impact" of the trailer at the beginning of a braking operation, first a relative increase of the trailer brake pressure takes place in relation to the trailer brake pressure usually resulting from the brake pressure of the tractor in order thus to compensate for the longer response time of the brake system of the trailer. In a braking operation with a large deceleration requirement, no relative increase of the trailer brake pressure takes place at the beginning of the braking operation in order to guarantee the shortest possible braking path and to ensure that no overbraking of the trailer takes place. In braking operations with a low deceleration requirement, no problems arise in respect of driving stability (lateral guiding, traction) due to a certain overbraking of the trailer at the beginning of a braking operation. On the contrary, clear improvements result in respect of comfort and economy.

Furthermore, in braking operations, control of the brake pressure of the trailer can be implemented so as to give an optimized coordination of the brake force distribution between the tractor and the trailer. This can take place in a manner according to the present invention in that the deceleration of the tractor resulting from a particular brake pressure is stored as a function of the respective load state (loading) when the tractor travels without a trailer. When travelling with a trailer, a brake pressure is then supplied for the trailer such that, under the prevailing load state of the tractor corresponding to the prevailing brake pressure, a deceleration is set which corresponds to the stored value of the tractor deceleration without a trailer under the same load state and the same brake pressure. It is thus guaranteed that, on one hand, the brakes of the tractor do not have to perform braking work which arises due to the additional load of the trailer, thereby avoiding overbraking of the tractor, and that, on the other hand, the brakes of the trailer do not have to perform braking work which arises due to the load of the tractor, thereby avoiding overbraking of the trailer. On the contrary, only that braking work is then performed by each part of the vehicle (tractor and trailer) which has to be applied due to the respective load of the individual parts of the vehicle.

BRIEF DESCRIPTION OF THE DRAWINGS

These and other objects, features and advantages of the present invention will become more readily apparent from the following detailed description of currently preferred embodiments when taken in conjunction with the accompanying drawings wherein.

DETAILED DESCRIPTION OF THE DRAWINGS

Figure 1:
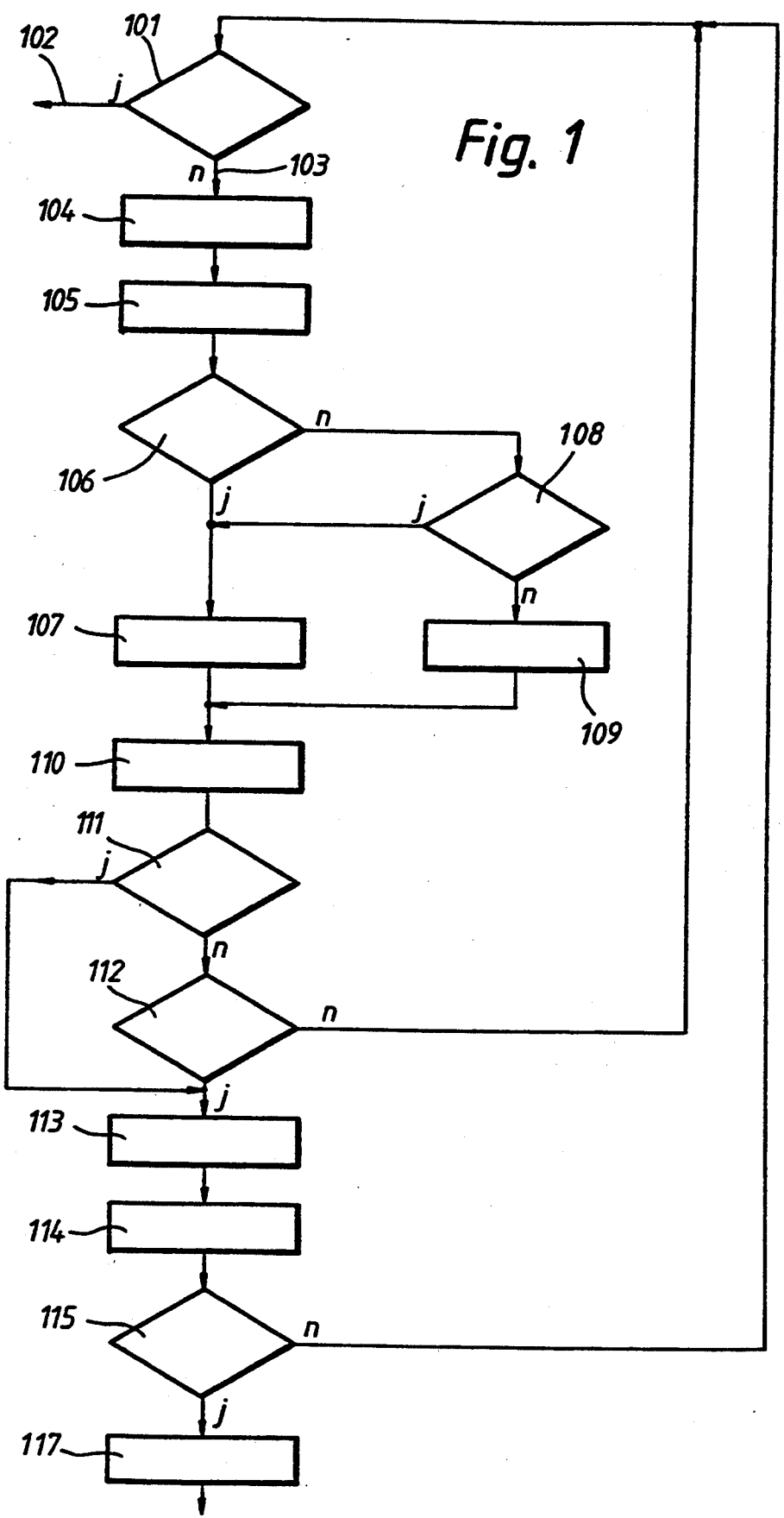
FIG. 1 is a flow chart showing the relative increase of the trailer brake pressure in relation to the trailer brake pressure usually resulting from the brake pressure of the tractor at the beginning of a braking operation.

As seen in FIG. 1, a check is first made in the box 101 as to whether the prevailing braking operation has a low or a large deceleration requirement. This can take place, for example, using the deceleration set value $z_{soll}$ of the tractor-trailer unit derived from the position of the brake pedal or using the temporal change $dz_{soll}/dt$ of the deceleration set value of the tractor-trailer unit derived from the actuation speed of the brake pedal. In this situation, a braking operation with a large deceleration requirement can be derived if the deceleration set value $z_{soll}$ is greater than 0.3 g. "g" also hereinbelow describes the acceleration due to gravity. A braking operation with a large deceleration requirement can likewise be derived if the temporal change of the deceleration set value $dz_{soll}/dt$ exceeds a value of 1.5*g/s. If it has been derived, as just explained, for example, that there is a large deceleration requirement, the procedure illustrated in FIG. 1 is ended (arrow 102), otherwise there is a move to step 104 in accordance with the arrow 103.

Correspondingly, the brake pressure $p_{Anh}$ is then determined in accordance with step 104. This brake pressure $p_{Anh}$ corresponds to the brake pressure of the trailer which usually results from the brake pressure of the tractor during a braking operation. The increase of the brake pressure of the trailer can take place by the brake pressure of the trailer $p_{Anh}$, which is normally set on the basis of the position of the brake pedal and the brake pressure of the tractor resulting from this position, being established and suitably increased. Instead of $p_{Anh}$, a brake pressure can now be targeted in accordance with the present invention on the trailer which is proportional to the brake pressure $p_{Anh}$. A proportionality constant, $f_{ü}$, is greater than 1 and still is dependent in an advantageous manner on the speed of the tractor-trailer unit at the beginning of the braking operation and on the temporal change of the deceleration set value $dz_{soll}/dt$, as is shown, for example, in FIG. 3. In step 105, the brake pressure $p_{Anh}$ is multiplied by the proportionality constant, $F_{ü}$, in order to maintain the brake pressure, $p_{BAnh}$, to be targeted at the beginning of the braking operation.

In accordance with step 106, a check is made as to whether this brake pressure, $p_{BAnh}$, to be targeted at the beginning of a braking operation, lies below a particular threshold value, $p_{Bmax}$, which can be in the order of magnitude of 2–3 bar. If the brake pressure, $p_{BAnh}$, to be targeted at the beginning of a braking operation exceeds the particular threshold value $p_{Bmax}$, excessive wheel slip may occur on the trailer. For this reason, a check takes place in step 108 as to whether there is an antiblocking system (ABS) on the trailer. If there is an ABS, there is a move to step 107 since it is then ensured, even in the case of a larger brake pressure on the trailer, that the braking operation cannot lead to the trailer wheels blocking. Otherwise, a limitation to the particular threshold value, $p_{Bmax}$, takes place for the brake pressure to be targeted at the beginning of the braking operation in accordance with step 109. If the brake pressure is below the value, $p_{Bmax}$, the brake pressure $p_{BAnh}$ is supplied at the beginning of a braking operation in accordance with step 107.

In accordance with step 110, the brake pressure, $p_B$, is then targeted for the trailer at the beginning of a braking operation. The brake pressure, $p_B$, corresponds either to the brake pressure, $p_{BAnh}$, or, if appropriate, its limit value, the brake pressure $p_{Bmax}$. A check is made in step 111 as to whether any ABS present on the trailer has been activated. If this is the case, it is concluded that the trailer should no longer be braked excessively. For this reason, there is a direct move to step 113, i.e. the point in time, $t_1$, is considered to be reached.

A check is made in step 112 as to whether the beginning of the braking operation with the increased trailer brake pressure has ended. For this purpose, the actual value of the deceleration, $z_{ist}$, is determined using the measured wheel speeds of the tractor. If this actual value of the deceleration, $z_{ist}$, reaches a particular fraction, x, which can be, e.g. 0.2 to 0.5, of the set value of the deceleration, $z_{soll}$, i.e. if the condition $z_{ist} \geq x * z_{soll}$ is met there is a move to step 113 in which there is a move to the actual braking operation in which both the tractor and the trailer are decelerated. This point in time is then denoted by $t_1$. In addition to this condition, a further condition is also monitored. In order not to decelerate with the use of the tractor brake too greatly, the time span $t_R$, which elapses from the point in time, $t_0$, to the point in time, $t_1$, is limited, specifically in such a way that with $f_{ü}$ dropping, $t_R$ can also decrease down to zero. In this situation, the calculation can be performed according to the following equation:

$$t_R = t_{R,max} * (f_{ü} - 1)$$

$t_{R,max}$ can be 0.1 to 0.3 s. If neither of the two conditions has yet been met, there is a return to step 101.

Advantageously, there is a continuous, especially linear, transition from the brake pressures at the beginning of the actual braking operation, i.e. from $t_1$ to the brake pressures on the tractor and the trailer which result on the basis of the position of the brake pedal and in accordance with a brake pressure distribution, PHIA, which is stipulated for the steady-state braking operation. PHIA is the ratio of the tractor brake pressure of the tractor to the trailer brake pressure. A time, $t_p$, is established in step 113, after which time the brake pressures should have been set which result on the basis of the position of the brake pedal, it also being possible for this time, $t_p$, to be varied advantageously as a function of the temporal change of the set value of the deceleration, $dz_{soll}/dt$, in that it is calculated, in the same manner as $t_R$, using the actual size of $f_{ü}$. This calculation is done according to the following equation:

$$t_p = t_{p,max} * (f_{ü} - 1).$$

In this case, just like $t_{R,max}$, $t_{P,max}$ can lie in the order of magnitude of 0.1 to 0.3 s. In accordance with step 114, a pressure change of $(p_{Anh} - p_B)/t_p$ is then targeted per unit of time for the trailer and a pressure change of $p_{Zug}/t_p$ for the tractor.

A check is then made in step 115 as to whether the time, $t_p$, has elapsed from the point in time, $t_1$. If this is the case, the phase of the pressure change is ended since the brake pressures, $p_{Anh}$, of the trailer and, $p_{Zug}$, of the tractor corresponding to the position of the brake pedal have then been reached. From this point in time onwards, the trailer brake pressure, $p_{Anh}$, is no longer increased during the current braking operation, that is to say in step 117 a ratio, $\Gamma$, between the tractor brake pressure, $p_{Zug}$, and the trailer brake pressure, $p_{Anh}$, corresponding to a steady-state braking operation is supplied. Otherwise, the loop from 101 again takes place in the next calculation cycle.

Figure 2:
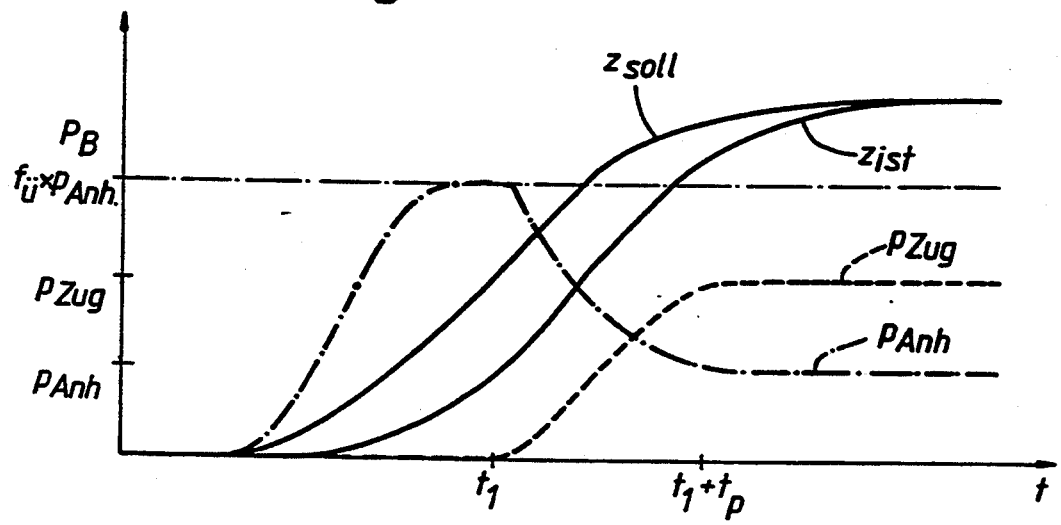
FIG. 2 is a graph showing the increase of the brake pressure of the trailer as a function of time.

FIG. 2 illustrates the increase of the trailer brake pressure, $p_{Anh}$, as a function of time. It can also be seen in FIG. 2 how the tractor brake pressure, $p_{Zug}$, rises with time and how the tractor-trailer unit deceleration, $z_{ist}$, increases with time and reaches the set value, $z_{soll}$. The trailer brake pressure, $p_{Anh}$, firstly rises until it has reached its set value, $f_{ü} * p_{Anh}$. This value of the pressure is then held until the point in time, $t_1$, until the actual value of the deceleration, $z_{ist}$, has reached a particular fraction x of the set value of the deceleration, $z_{soll}$, or the time, $t_R$, has elapsed since the beginning of the braking operation. From the point in time, $t_1$, up to the point in time, $t_1 + t_p$, the trailer brake pressure, $p_{Anh}$, is then decreased to its end value and the tractor brake pressure, $p_{Zug}$, is increased to its end value. Both the decrease and the increase of the brake pressures take place continuously.

Figure 3:
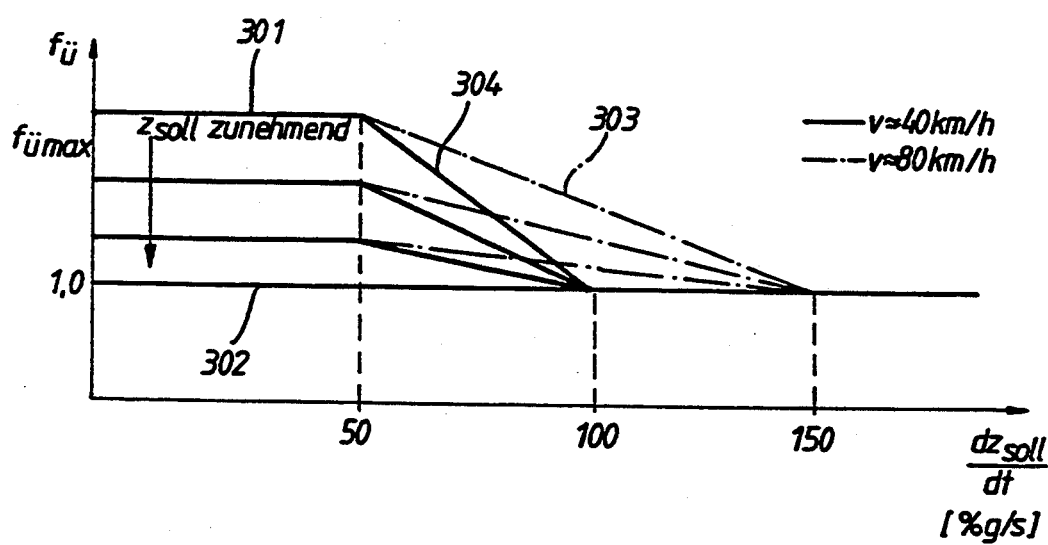
FIG. 3 is a graph showing the dependence of the increase of the brake pressure of the trailer as a function of the temporal change of the set value of the deceleration of the tractor-trailer unit and as a function of the speed of the tractor-trailer unit at the beginning of the braking operation.

According to FIG. 3, there is a variation in the size of the brake pressure, $P_B$, at the beginning of a braking operation. The parameter, $f_{ü}$, is the factor with which the trailer brake pressure, $p_{Anh}$, resulting from the position of the brake pedal is multiplied in order to maintain the brake pressure, $p_B$, to be targeted at the beginning of the braking operation. In principle, it can thus be seen in FIG. 3 that, with an increasing rate of change of the set value of the deceleration, $dz_{soll}/dt$, the factor, $f_{ü}$, decreases, i.e. that the relative increase of the trailer brake pressure is reduced. The relative change of the set acceleration is thus plotted relative to the acceleration due to gravity, g, per second, s. In this case, the curve 301 shows the ratios at set values of the deceleration, $z_{soll} \leq 0.15$ g. The curve 302 shows the ratios at set values of the deceleration, $z_{soll} \geq 0.3$ g. With an increasing set value of the deceleration, $z_{soll}$, the curves located further down in FIG. 3 thus apply. The uninterrupted parts of the curves at values of $dz_{soll}/dt$ greater than 50 (curve 304) apply to a speed range of less than 40 km/h, the dot/dashed parts of the curves at values of $dz_{soll}/dt$ greater than 50 (curve 303) apply to a speed range of greater than 80 km/h.

The factor $f_{ü}$ is accordingly established as follows. In the range $dz_{soll}/dt < =0.5$ g/s, the value $f_{ü1}$ corresponding to the curve 301 is taken if $z_{soll}$ or $z_{ist}$ is smaller than 0.15 g. The value $f_{ü2}$ corresponding to the curve 302 is taken if $z_{soll}$ is greater than 0.3 g. If $z_{soll}$ lies between 0.15 g and 0.3 g, an interpolation is carried out. If a linear interpolation takes place between the two curves 301, 302, this is done according to the following equation:

$$f_{ü} = f_{ü2} + (f_{ü1} - f_{ü2}) * (0.3 \, g - z_{soll})/(0.3 \, g - 0.15 \, g) \quad (1)$$

In the range $dz_{soll}/dt > 0.5$ g/s, two intermediate values are calculated, if appropriate, as a function of the speed. If the speed v is below 40 km/h, the final calculation of the factor $f_{ü}$ is carried out according to the equation (1), the value corresponding to the speed 40 km/h and the current value of $dz_{soll}/dt$ being used for $f_{ü1}$. If the speed v is above 80 km/h, the final calculation of the factor $f_{ü}$ is carried out according to the equation (1), the value corresponding to the speed 80 km/h being used for $f_{ü1}$. If the speed v lies between 40 km/h and 80 km/h, an interpolation is carried out between two intermediate values. In that case, the first intermediate value $f_{üZ1}$ is calculated according to equation (1) by using the value corresponding to the speed 40 km/h for $f_{ü1}$. The second intermediate value is likewise calculated according to equation (1) by using the value corresponding to the speed 80 km/h for $f_{ü1}$. The final factor $f_{ü}$ is calculated in the latter case according to the following equation:

$$f_{ü} = f_{üZ2} + (f_{üZ1} - f_{üZ2}) * (v - 40 \, km/h)/(80 \, km/h - 40 \, km/h) \quad (2)$$

The maximum value $f_{ümax}$ of the factor $f_{ü}$ is about 2.5 for a twin-axle tractor and about 2.0 for a triple-axle tractor.

Figure 4:
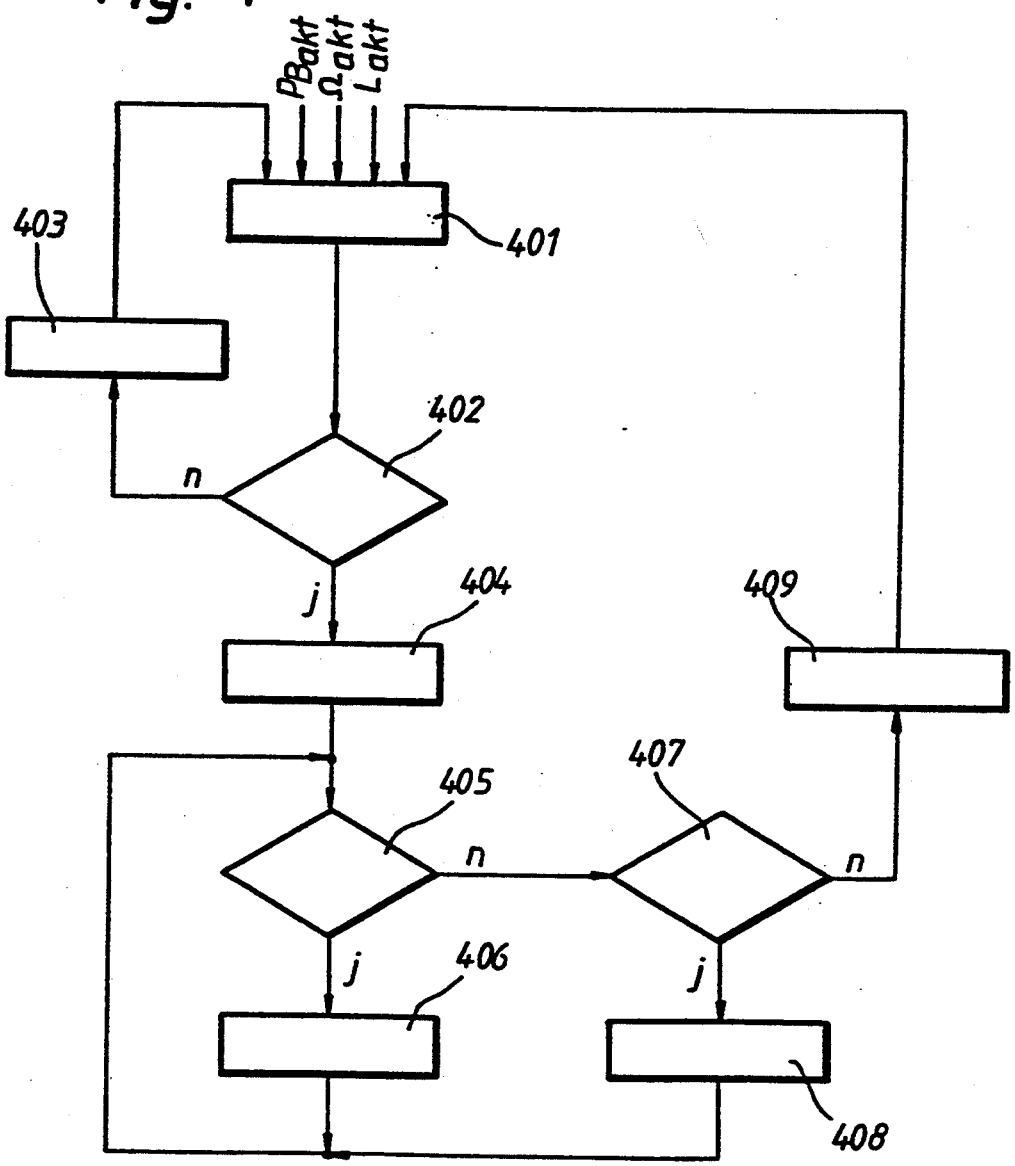
FIG. 4 is a flow chart of the method according to the present invention, according to which the ratio $\Gamma$ of the brake pressure $p_{Zug}$ of the tractor to the brake pressure $p_{Anh}$ of the trailer during the steady-state phase of a braking operation is stipulated.

FIG. 4 is a flow chart of the method according to the present invention, according to which a current value for the ratio, $\Gamma$, of the tractor brake pressure, $p_{Zug}$, to the trailer brake pressure, $p_{Anh}$, during the steady-state phase of a braking operation is stipulated. The ratio, $\Gamma$, is stipulated as a function of the deviation of the actual deceleration from the set deceleration at a particular brake pressure taking the tractor load state into consideration. Measured values are first read a step 401 and include the tractor brake pressure, $p_{Zug,akt}$, the speed $\Omega_{akt}$ of at least one wheel, of the tractor and/or of the trailer as well as the loading stage $L_{akt}$. The tractor brake pressure, $p_{Zug,akt}$, can be measured directly or the value of the tractor brake pressure, $p_{Zug}$, targeted on the basis of the position of the brake pedal can be used as measured value. The speed, $\Omega_{akt}$, is measured directly and the momentary deceleration, $z_{ist}$, then derived in a manner known per se from the measured speed, $\Omega_{akt}$. Methods of establishing the deceleration from the speed, $\Omega_{akt}$, are described in sufficient numbers in conjunction with antiblocking systems (ABS). The loading stage, $L_{akt}$, can be recorded by sensing the pressure of the bellows in air suspension tractors and the spring path in tractors with steel suspension. In order thereby to be able to rule out erroneous measured values as a result of shifts in the axle loading, the load state is advantageously recorded at a constant travelling speed. The signal representing the load state is advantageously additionally filtered at a low limit frequency. Moreover, the load state can be recorded by evaluating the wheel speed differences between the front and the rear wheels. In that case, differences in the tire radius result as a function of the rear axle load and lead to the wheel speed differences. Measured values read in are first processed in step 401 such that the ratio $\delta(L_{akt})_{akt}$ of the actual value of the deceleration, $z_{ist}$, to the brake pressure, $p_{akt}$, is formed.

A check is made in step 402 as to whether there is a trailer on the tractor during the braking operation. This can be recognized in a known manner via a trailer plug connection. If there is no trailer on the tractor, the method proceeds to step 403 in which the stored values of the ratio $\delta(L)_{store}$ are updated. Otherwise, a trailer brake pressure, $p_{Anh}$, is targeted in accordance with step 404 such that the ratio, $\Gamma$, between the tractor brake pressure, $p_{Zug}$, and the trailer brake pressure, $p_{Anh}$, is implemented. An initial value for the ratio, $\Gamma$, can be given by, for example, the deceleration band.

In step 403, the stored ratio, $\delta(L)_{store}$, is updated by the value, $\delta(L_{akt})_{akt}$, established in step 401. The values, $\delta(L_{akt})_{store}$, can be deposited so that a plurality of support values are stored over the range of all the possible load states. The ratio, $\delta(L_{akt})_{store}$, corresponding to the momentary load state, $L_{akt}$, is updated. This updating expediently takes place in the form of a sliding mean value procedure, i.e. the new value is calculated with the previously stored value with a lower weighting. This weighting can be a few percent, in particular 5%. In step 404, the brake pressure corresponding to the ratio, $\Gamma$, is then targeted on the trailer.

A check is then made in step 405 as to whether the value of the current ratio, $\delta(L_{akt})_{akt}$ (tractor and trailer), is greater than the stored value of the ratio, $\delta(L_{akt})_{store}$ (tractor without trailer). If the former is greater, a deceleration, $z_{ist}$, of the tractor-trailer unit has been set which is greater than one corresponding to the momentary level of the tractor brake pressure, $p_{Zug}$. There is then obviously overbraking of the trailer. In step 406, a reduction of the trailer brake pressure, $p_{Anh}$, is then undertaken. This reduction can take place such that the order of magnitude of this reduction takes place as a function of the difference between the ratio, $\delta(L_{akt})_{akt}$, and the stored ratio, $\delta(L_{akt})_{store}$. This dependence can, in particular, be proportional. The sequence of the procedure is then again continued with step 405.

If it was established in step 405 that the ratio, $\delta(L_{akt})_{akt}$, is not greater than the ratio, $\delta(L_{akt})_{store}$, a check is made in step 407 as to whether the ratio, $\delta(L_{akt})_{akt}$, is smaller than the ratio, $\delta(L_{akt})_{store}$. If the former is smaller than the latter, a deceleration, $z_{ist}$, of the tractor-trailer unit has been set which is smaller than one corresponding to the momentary level of the tractor brake pressure, $p_{Zug}$. The braking of the trailer is then obviously too weak. In step 408, an increase in the trailer brake pressure, $p_{Anh}$, is then undertaken. This increase can take place so that the order of magnitude of this increase takes place as a function of the amount of the difference between the ratio, $\delta(L_{akt})_{akt}$, and the stored ratio, $\delta(L_{akt})_{store}$. This dependence can, in particular, be proportional. The sequence of the procedure is then again continued with step 405.

If it was established in step 407 that the ratio, $\delta(L_{akt})_{akt}$, is not smaller than the ratio, $\delta(L_{akt})_{store}$, the ratio, $\Gamma$, is updated in step 409. This updating expediently takes place in the form of a sliding mean value procedure, i.e. the new value of the ratio, $\Gamma$, is calculated with the value of the ratio, $\Gamma$, previously stored for the journey with a lower weighting. This weighting can be a few percent, in particular 5% to 20%. The sequence of the procedure then begins again with step 401.

In the two checks 405 and 407, it is expediently not merely checked whether the ratio, $\delta(L_{akt})_{akt}$, is greater or smaller than the ratio, $\delta(L_{akt})_{store}$, but whether the difference between, $\delta(L_{akt})_{akt}$, and $\delta(L_{akt})_{store}$, does not exceed (step 405) or fall below (step 407) a certain value. Within a certain range around the value, $\delta(L_{akt})_{store}$, which corresponds to this certain value, it can be assumed that, within a permissible tolerance, only that braking work is performed by each part of the vehicle (tractor and trailer) which has to be applied by them on the basis of the respective load of the individual parts of the vehicle.

As a default value at the beginning of the method according to the present invention, a trailer brake pressure, $p_{Anh}$, is targeted on the trailer which will correspond to a ratio of $r=1$. The tractor and the trailer are then within the tolerance of the EC braking band and unsafe handling characteristics of the tractor-trailer unit due to an inadequate distribution of the braking force between the tractor and trailer are thus not possible even under these conditions.

Figure 5:
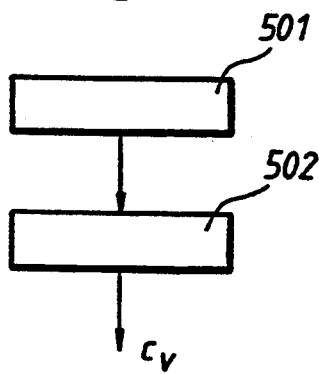
FIG. 5 is a flow chart illustrating the possibility of standardizing the ratio $\delta(L)$ of the deceleration $z_{ist}$ to the brake pressure $p_{Zug}$ of the tractor.
Figure 6:
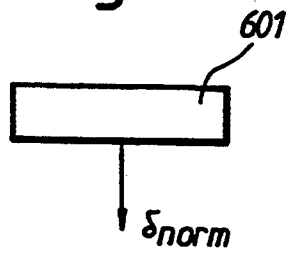
FIG. 6 is a flow chart showing the performance of the standardization of individual values to the ratio $\delta$.

A possibility of standardizing the parameter, $\delta(L)$, can be seen in FIGS. 5 and 6. Since the deceleration, $z_{ist}$, achievable at a particular brake pressure, $p_{Zug}$, depends on the travelling speed, it is advantageous to undertake standardization for a comparison of the parameter, $\delta(L)$, with a parameter, $\delta(L)$, determined later for a tractor-trailer unit using the same tractor. In this case, FIGS. 5 and 6 exemplify the ratios with standardization to a particular travelling speed, $v_{ref}$. The $\delta$ values are recorded in a range from $v_{min}$ to $v_{max}$ in a step 501. In a step 502, a straight line is then drawn through these measuring points, for example by the method of the smallest fault squares, which then has the following form:

$$\delta = \delta - c_v v.$$

These two steps 501 and 502 in FIG. 5 can be carried out in preliminary experiments as representative of entire vehicle construction series. The value, $c_v$, is then stored permanently in the electronic system.

FIG. 6 then shows the performance of the standardization of individual values of the ratio, $\delta$. A particular speed, $v_{ref}$, is stipulated, to which standardization takes place. The standardized ratio, $\delta_{norm}$, at a current travelling speed, $v_{akt}$, and a determined current ratio, $\delta_{akt}$, is then calculated in a step 601 according to the following equation:

$$\delta_{norm} = \delta_{akt} c_v (v_{akt} - v_{ref})$$

In principle, the standardization can also take place according to other parameters, such as, e.g., the product of the travelling speed, v, and the deceleration, z.

Although the invention has been described and illustrated in detail, it is to be clearly understood that the same is by way of illustration and example, and is not to be taken by way of limitation. The spirit and scope of the present invention are to be limited only by the terms of the appended claims.

We claim:

1. A method of determining an optimized value of brake pressure ratio between a tractor and one of a trailer and semitrailer, comprising selectively increasing a variable initial targeted brake pressure of one of the trailer and the semitrailer in relation to a trailer or semitrailer brake pressure resulting from a brake pedal position for a particular duration only at initiation of a braking operation, wherein the increase of the brake pressure of one of the trailer and semitrailer is a variable increase as a function of the trailer or semitrailer brake pressure resulting from the brake pedal position.

2. The method according to claim 1, wherein the increase of the brake pressure of one of the trailer and semitrailer only takes place fully if the intensity of the braking operation is below predetermined threshold values of at least one of brake pedal actuation speed and a deceleration set value.

3. The method according to claim 1, wherein the increase of the brake pressure of one of the trailer and semitrailer is ended when one of an actual value of the deceleration has reached a predetermined fraction of its set value and a predetermined time span has elapsed since the beginning of the braking operation.

4. The method according to claim 3, wherein the increase of the brake pressure of one of the trailer and semitrailer only takes place fully if the intensity of the braking operation is below predetermined threshold values of at least one of brake pedal actuation speed and a deceleration set value.

5. The method according to claim 1, wherein the size of the increase of the brake pressure of one of the trailer and semitrailer varies with travelling speed of a tractor-trailer unit prior to the beginning of the braking operation.

6. The method according to claim 5, wherein the increase of the brake pressure of one of the trailer and semitrailer only takes place fully if the intensity of the braking operation is below predetermined threshold values of at least one of brake pedal actuation speed and a deceleration set value.

7. The method according to claim 5, wherein the increase of the brake pressure of one of the trailer and semitrailer is ended when one of an actual value of the deceleration has reached a predetermined fraction of its set value and a predetermined time span has elapsed since the beginning of the braking operation.

8. The method according to claim 1, wherein the size of the increase of the brake pressure of one of the trailer and semitrailer varies with at least one of a set value of deceleration and brake pedal actuation speed.

9. The method according to claim 8, wherein the increase of the brake pressure of one of the trailer and semitrailer only takes place fully if the intensity of the braking operation is below predetermined threshold values of at least one of brake pedal actuation speed and a deceleration set value.

10. The method according to claim 8, wherein the increase of the brake pressure of one of the trailer and semitrailer is ended when one of an actual value of the deceleration has reached a predetermined fraction of its set value and a predetermined time span has elapsed since the beginning of the braking operation.

11. The method according to claim 8, wherein the size of the increase of the brake pressure of one of the trailer and semitrailer varies with travelling speed of a tractor-trailer unit prior to the beginning of the braking operation.

* * * * *